US012668112B2

(12) United States Patent (10) Patent No.: US 12,668,112 B2
Kaltenbach et al. (45) Date of Patent: Jun. 30, 2026

(54) DRIVE UNIT FOR A VEHICLE

(71) Applicant: ZF Friedrichshafen AG,
Friedrichshafen (DE)

(72) Inventors: Johannes Kaltenbach, Friedrichshafen
(DE); Thomas Martin, Weissensberg
(DE); Alexander Thorwart,
Langenargen (DE); Michael Preuß,
Friedrichshafen (DE)

(73) Assignee: ZF Friedrichshafen AG,
Friedrichshafen (DE)

( * ) Notice: Subject to any disclaimer, the term of this
patent is extended or adjusted under 35
U.S.C. 154(b) by 0 days.

(21) Appl. No.: 19/069,343

(22) Filed: Mar. 4, 2025

(65) Prior Publication Data

US 2025/0282209 A1 Sep. 11, 2025

(30) Foreign Application Priority Data

Mar. 5, 2024 (DE) ..................... 10 2024 202 036.2

(51) Int. Cl.
  B60K 1/02 (2006.01)
  B60K 17/04 (2006.01)
    (Continued)
(52) U.S. Cl.
  CPC .............. B60K 1/02 (2013.01); B60K 17/046
    (2013.01); B60K 17/16 (2013.01); F16H 3/66
    (2013.01);
    (Continued)
(58) Field of Classification Search
  CPC ........ B60K 1/02; B60K 17/16; B60K 17/046;
    B60K 17/08; B60K 17/22; B60Y
    2200/91;
    (Continued)

(56) References Cited

U.S. PATENT DOCUMENTS

2014/0221153 A1* 8/2014 Xue ........................ B60K 6/547
                                                        477/5
2022/0364631 A1* 11/2022 Glückler ................... F16H 3/78
                        (Continued)

FOREIGN PATENT DOCUMENTS

DE        102023100823 A1 *  3/2014  ............. B60K 17/08
DE    10 2013 214 238        1/2015
                        (Continued)

OTHER PUBLICATIONS

German Patent Office, German Search Report issued in German
Patent application No. 10 2024 202 036.2 (Jan. 16, 2025).

*Primary Examiner* — Tinh T Dang
(74) *Attorney, Agent, or Firm* — Secant IP, PLLC

(57) ABSTRACT

A drive unit has a first and second electric motors arranged
axially parallel, a manual gearbox arranged axially parallel
to the motors and having first and second planetary gearsets,
a positive-locking shift unit, a differential, a drive shaft, and
a driven shaft. The first shift unit having first, second, and
third shift elements, and an axially displaceable sliding
sleeve. Closing the first shift element shifts a first gear,
where the first web shaft, the second hollow gear shaft, and
the driven shaft are connected in a rotationally fixed manner.
Closing the second shift element shifts a second gear, where
the second web shaft and the driven shaft are connected
rotationally fixed. Closing the third shift element shifts a
third gear, where the first sun shaft, the second sun shaft, the
drive shaft, and the driven shaft are connected rotationally
fixed.

12 Claims, 11 Drawing Sheets

(51) Int. Cl.

| | |
|---|---|
| *B60K 17/16* | (2006.01) |
| *F16H 3/66* | (2006.01) |
| *F16H 48/06* | (2006.01) |
| *F16H 48/08* | (2006.01) |
| *F16H 57/08* | (2006.01) |

(52) U.S. Cl.
CPC ........... *B60Y 2200/91* (2013.01); *F16H 3/663* (2013.01); *F16H 48/08* (2013.01); *F16H 57/08* (2013.01); *F16H 2200/0039* (2013.01); *F16H 2200/2064* (2013.01); *F16H 2200/2094* (2013.01)

(58) Field of Classification Search
CPC . F16H 3/66; F16H 3/663; F16H 48/08; F16H 57/023; F16H 57/08; F16H 57/082; F16H 2200/0021; F16H 2200/0034; F16H 2200/0039; F16H 2200/2007; F16H 2200/201; F16H 2200/2035; F16H 2200/2038; F16H 2200/2064; F16H 2200/2094; F16H 2200/2097
See application file for complete search history.

(56) References Cited

U.S. PATENT DOCUMENTS

| | | | |
|---|---|---|---|
| 2023/0101199 A1 | 3/2023 | Brilka et al. | |
| 2023/0311629 A1 * | 10/2023 | Raeder ................... | B60K 17/16 180/65.6 |

FOREIGN PATENT DOCUMENTS

| | | | | |
|---|---|---|---|---|
| DE | 102019206954 A1 * | 11/2020 | ........... | B60K 17/046 |
| DE | 10 2021 000 294 | 3/2021 | | |
| DE | 10 2022 208 157 | 2/2024 | | |
| WO | WO2020035558 A1 | 2/2020 | | |

* cited by examiner

DRIVE UNIT FOR A VEHICLE

RELATED APPLICATIONS

This application claims the benefit of and right of priority under 35 U.S.C. § 119 to German Patent Application no. 10 2024 202 036.2, filed on 5 Mar. 2024, the contents of which are incorporated herein by reference in its entirety.

FIELD OF THE DISCLOSURE

The invention relates to a drive unit for a vehicle, wherein the drive unit has two electric motors, a manual gearbox with several gears, and a differential. The invention also relates to a vehicle with such a drive unit.

BACKGROUND

For example, DE 10 2013 214 238 A1 discloses a drive unit for a vehicle, wherein the drive unit has several electric motors, at least one planetary gearbox, and several positive-locking shift elements. A first electric motor is directly or indirectly permanently coupled to a sun gear of a first planetary gearbox, wherein a second electric motor is directly or indirectly coupled either to the sun gear of the first planetary gearbox or to a carrier of the first planetary gearbox, as a function of the shift position of a first positive-locking shift element and of a second positive-locking shift element. A hollow gear of the first planetary gearbox is coupled either to a housing or to the web of the first planetary gearbox as a function of the shift position of a third positive-locking shift element and a fourth positive-locking shift element.

SUMMARY

The object of the present invention is to provide an alternative drive unit for a vehicle. In particular, the drive unit should be compact. The problem is solved by a drive unit with the features of a drive unit as variously disclosed herein. Additional advantageous embodiments will be apparent from the following description, and the figures.

A drive unit for a vehicle according to the invention comprises a first electric motor, a second electric motor arranged axially parallel thereto, a manual gearbox arranged axially parallel to the two electric motors and having a first planetary gear set, a second planetary gear set and a first positive-locking shift unit, a differential with a differential input shaft and two differential output shafts, a drive shaft for connecting the first electric motor to the manual gearbox and a driven shaft for connecting the manual gearbox to the differential, wherein the first planetary gear set has a first sun shaft, a first hollow gear shaft, and a first web shaft, wherein the second planetary gear set has a second sun shaft, a second hollow gear shaft, and a second web shaft, wherein the first sun shaft, the second sun shaft, and the drive shaft are connected in a rotationally fixed manner, wherein the first web shaft and the second hollow gear shaft are connected in a rotationally fixed manner, wherein the second web shaft and the driven shaft are connected in a rotationally fixed manner, wherein the first shift unit has a first shift element, a second shift element, a third shift element, and an axially displaceable first sliding sleeve, wherein a first gear with a first transmission ratio is shifted in the closed state of the first shift element, wherein in the first gear the first web shaft and the second hollow gear shaft are connected in a rotationally fixed manner to a stationary component, wherein in the closed state of the second shift element a second gear with a second transmission ratio is shifted, wherein in the second gear the first hollow gear shaft is connected in a rotationally fixed manner to the stationary component, wherein in the closed state of the third shift element a third gear with a third transmission ratio is shifted, wherein in the third gear the first and the second planet sets are locked. To lock the two planetary gear sets, two of the three shafts of the respective planetary gear set can be connected to each other or a shaft of the first planetary gear set can be connected to a shaft of the second planetary gear set. If a planetary gear set is blocked, it rotates in the block. For example, when the fourth shift element is in a closed state, the first hollow gear shaft, the second hollow gear shaft, and the first web shaft are connected in a rotationally fixed manner. The first web shaft carries multiple planetary gears which mesh with the first sun shaft and with the first hollow gear shaft, i.e., engage in a tooth mesh. The second web shaft carries several planetary gears that mesh with the second sun shaft and the second hollow gear shaft. The two planetary gear sets are arranged axially adjacent to each other in order to save radial installation space. Reference is made here to the embodiments shown in FIG. 2 through FIG. 7.

A further drive unit for a vehicle according to the invention comprises a first electric motor, a second electric motor arranged axially parallel thereto, a manual gearbox arranged axially parallel to the two electric motors and having a first planetary gear set, a second planetary gear set, and a first positive-locking shift unit, a differential with a differential input shaft and two differential output shafts, a drive shaft for connecting the first electric motor to the manual gearbox and a driven shaft for connecting the manual gearbox to the differential, wherein the first planetary gear set has a first sun shaft, a first hollow gear shaft, and a first web shaft, wherein the second planetary gear set has a second sun shaft, a second hollow gear shaft, and a second web shaft, wherein the first sun shaft, the second sun shaft, and the drive shaft are connected in a rotationally fixed manner, wherein the first web shaft and the second hollow gear shaft are connected in a rotationally fixed manner, wherein the first hollow gear shaft is connected in a rotationally fixed manner to a stationary component, wherein the first shift unit has a first shift element, a second shift element, a third shift element, and an axially displaceable first sliding sleeve, wherein in the closed state of the first shift element a first gear with a first transmission ratio is shifted, wherein in the first gear the first hollow gear shaft, the second hollow gear shaft, and the driven shaft are connected in a rotationally fixed manner, wherein in the closed state of the second shift element a second gear with a second transmission ratio is engaged, wherein in the second gear the second web shaft and the driven shaft are connected in a rotationally fixed manner, wherein in the closed state of the third shift element a third gear with a third transmission ratio is engaged, wherein in the third gear the first sun shaft, the second sun shaft, the drive shaft, and the driven shaft are connected in a rotationally fixed manner. Consequently, when the third shift element is closed, the drive shaft and the driven shaft are connected in a rotationally fixed manner, creating a direct gear. The first web shaft carries multiple planetary gears which mesh with the first sun shaft and with the first hollow gear shaft, i.e., engage in a tooth mesh. The second web shaft carries several planetary gears that mesh with the second sun shaft and the second hollow gear shaft. The two planetary gear sets are arranged axially adjacent to each other in order to save radial installation space. Reference is made here to the embodiments shown in FIG. 8 through FIG. 11.

A further drive unit for a vehicle according to the invention comprises a first electric motor, a second electric motor arranged axially parallel thereto, a manual gearbox arranged axially parallel to the two electric motors with a stepped planetary gear set and a first positive-locking shift unit, a differential with a differential input shaft and two differential output shafts, a drive shaft for connecting the first electric motor to the manual gearbox and a driven shaft for connecting the manual gearbox to the differential, wherein the stepped planetary gear set comprises a first sun shaft, a second sun shaft, a hollow gear shaft, and a web shaft with a plurality of stepped planetary gears, each having a first and a second gear wheel connected in a rotationally fixed manner, wherein the first gear wheel engages in a tooth mesh with the first sun shaft and the hollow gear shaft, wherein the second gear wheel engages in a tooth mesh with the second sun shaft, wherein the first sun shaft and the drive shaft are connected in a rotationally fixed manner, wherein the hollow gear shaft is connected in a rotationally fixed manner to a stationary component, wherein the first shift unit has a first shift element, a second shift element, a third shift element, and an axially displaceable first sliding sleeve, wherein in the closed state of the first shift element a first gear with a first transmission ratio is shifted, wherein in the first gear the web shaft and the driven shaft are connected in a rotationally fixed manner, wherein in the closed state of the second shift element a second gear with a second transmission ratio is engaged, wherein in the second gear the second sun shaft and the driven shaft are connected in a rotationally fixed manner, wherein in the closed state of the third shift element a third gear with a third transmission ratio is engaged, wherein in the third gear the first sun shaft, the drive shaft, and the driven shaft are connected in a rotationally fixed manner. Consequently, when the third shift element is closed, the drive shaft and the driven shaft are connected in a rotationally fixed manner, creating a direct gear. Reference is made here to the embodiment shown in FIG. 12.

A "shift element" is a shiftable device which, in a closed state, connects two shafts or a shaft and a housing in a rotationally fixed manner and, in an open state, decouples the two shafts or the shaft and the housing from each other. Two shafts can then rotate relative to each other. For the purposes of the invention, a "shaft" is to be understood as a rotatable component of the gearbox, via which associated components of the gearbox are connected to each other in a rotationally fixed manner or via which such a connection can be established when one of the shift elements is actuated. The respective shaft can connect the components axially or radially or both axially and radially. The respective shaft can also be present as an intermediate piece, via which a respective component is connected radially, for example. The term "shaft" does not exclude the possibility that the components to be connected may be designed in one piece. In particular, two or more shafts connected to each other in a rotationally fixed manner can be designed in one piece.

The first, second, and third shift elements are designed as gear shift elements and are therefore set up to shift gears. When the first shift element is closed and the second and third shift elements are open, a first gear is shifted with a first transmission ratio. When the second shift element is closed and the first and third shift elements are open, a second gear with a second ratio is shifted. When the third shift element is closed and the first and second shift elements are open, a third gear with a third transmission ratio is shifted.

In particular, the first shift unit has five shift positions, which are engaged by axially displacing the first sliding sleeve by means of a first actuator. The first shift unit has a neutral position between every two gear positions, so that three gear positions and two neutral positions are provided for five shift positions. In a respective neutral position, two shafts are decoupled from each other via the first shift unit, wherein the first sliding sleeve is then in rotary engagement with a single shaft or with the stationary component. A "stationary component" is a component that is fixed in a stationary position, in particular is connected to a housing or part of a housing in a rotationally fixed or integral manner. In particular, the first actuator moves the first sliding sleeve into the respective shift position, thereby realizing three gears. The first sliding sleeve has a form-fit design and has form-fit claws that interact in a form-fit manner in the respective gear position with a respective corresponding claw toothing in order to set a rotationally fixed connection between two shafts or a shaft and the stationary component. Consequently, the respective claw toothing, with which the first sliding sleeve interacts positively, is to be understood as a shift element. Preferably, the first shift unit comprises an unsynchronized claw clutch. The three shift elements are therefore designed as positive-locking shift elements. The efficiency of the drive unit can be increased due to reduced drag losses thanks to positive-locking shift elements. In particular, positive-locking shift elements are more compact and efficiency-optimized and have a cost advantage over friction-locking shift elements. The use of a single sliding sleeve and a single actuator for shifting three gears further increases compactness.

According to one embodiment, the first electric motor is connected to the drive shaft via a first spur gear stage, wherein the second electric motor can be connected to the drive shaft or to the driven shaft via a second spur gear stage and a second shift unit with a fourth shift element, a fifth shift element, and a second sliding sleeve. In other words, the connection of the second electric motor to the respective shaft is dependent on the shift position of the second shift unit. When the fourth shift element is closed, the second electric motor is connected to the drive shaft with a driving effect. When the fifth shift element is closed, the second electric motor is connected to the driven shaft with a driving effect. In particular, the first spur gear stage has a first spur gear and a second spur gear that engage in a tooth mesh with each other. For example, the first spur gear is connected to a rotor shaft of the first electric motor in a rotationally fixed manner, while the second spur gear is connected to the drive shaft in a rotationally fixed manner. In particular, the second spur gear stage has a third spur gear and a fourth spur gear that engage in a tooth mesh with each other. For example, the third spur gear is connected to a rotor shaft of the second electric motor in a rotationally fixed manner, wherein the fourth spur gear can be connected to the drive shaft or the driven shaft in a rotationally fixed manner via the second shift unit. Reference is made here to the embodiments shown in FIG. 3 and FIG. 4.

According to one embodiment, the first electric motor is connected to the drive shaft via a first spur gear stage and a second spur gear stage, wherein the second electric motor can be connected to the drive shaft or to the driven shaft via a third spur gear stage, a fourth spur gear stage, and a second shift unit with a fourth shift element, a fifth shift element, and a second sliding sleeve. In particular, the first spur gear stage has a first spur gear and a second spur gear that engage in a tooth mesh with each other. Furthermore, the second spur gear stage has a third spur gear and a fourth spur gear that engage in a tooth mesh with each other. For example, the first spur gear is connected to a rotor shaft of the first electric motor in a rotationally fixed manner, wherein the second and third spur gears are connected in a rotationally fixed manner, wherein the fourth spur gear is connected to the drive shaft in a rotationally fixed manner. In particular, the third spur gear stage has a fifth spur gear and a sixth spur gear that engage in a tooth mesh with each other. Furthermore, the fourth spur gear stage has a seventh spur gear and an eighth spur gear that engage in a tooth mesh with each other. The fifth spur gear, for example, is connected in a rotationally fixed manner to a rotor shaft of the second electric motor, wherein the sixth and seventh spur gears are connected in a rotationally fixed manner, wherein the eighth spur gear can be connected in a rotationally fixed manner to the drive shaft or to the driven shaft via the second shift unit. Reference is made here to the embodiments shown in FIG. 2, FIG. 5, FIG. 6, and FIG. 8.

For example, the second shift unit is arranged radially nested with the first spur gear stage and the third spur gear stage. In particular, the first spur gear stage and the second spur gear stage are radially nested on an outer circumference of the first shift unit in order to save axial space. Consequently, the second shift unit, the first spur gear stage, and the third spur gear stage are at least partially located in the same axial installation space plane. Reference is made here to the embodiments shown in FIG. 2, FIG. 6, and FIG. 8.

The second electric motor can use the three gears of the manual gearbox by connecting it to the drive shaft. The fourth shift element is closed for this purpose. The second electric motor can drive directly onto the driven shaft independently of the first electric motor when the fifth shift element is closed.

In particular, the second shift unit has three shift positions, which are engaged by axially displacing the second sliding sleeve by means of a second actuator. The second shift unit has a neutral position between two gear positions, so that with three shift positions, two gear positions and one neutral position are provided. In a neutral position, two shafts are decoupled from each other via the second shift unit, wherein the second sliding sleeve is then in rotary engagement with a single shaft. In particular, the second actuator moves the second sliding sleeve into the respective shift position and thereby couples the second electric motor to the manual gearbox and the differential. The second sliding sleeve has a form-fit design and has form-fit claws that interact in a form-fit manner with a corresponding claw toothing in the respective gear position in order to set a rotationally fixed connection between two shafts. Consequently, the respective claw toothing, with which the second sliding sleeve interacts positively, is to be understood as a shift element. Preferably, the second shift unit comprises an unsynchronized claw clutch. The fourth and fifth shift elements are therefore designed as positive-locking shift elements. The efficiency of the drive unit can be increased due to reduced drag losses thanks to positive-locking shift elements. The use of a single sliding sleeve and a single actuator for shifting the fourth and fifth shift elements makes the drive unit even more compact.

In the closed state of the fourth shift element, i.e., in the first shift position of the second sliding sleeve, the second electric motor is connected to the drive shaft in a drive-effective manner, wherein torque summation of the two electric motors is thereby made possible, with both electric motors having the three gears of the manual gearbox.

In the open state of the fourth and fifth shift element, i.e., in the second shift position or neutral position of the second sliding sleeve, the second electric motor is decoupled from the drive train, which means that electrical losses and losses due to rotating bearings can be reduced, for example in partial load operation.

In the closed state of the fifth shift element, i.e., in the third shift position of the second sliding sleeve, the second electric motor is connected to the driven shaft with a drive effect, which means that drive power can be introduced into the manual gearbox via a second path. In this way, the second electric motor can drive the vehicle independently of the first electric motor and support the tensile force during the shifting of the first electric motor. This is commonly known as "output-supported shifting" or "electromotive shifting" (EMS).

According to an alternative embodiment, the second shift unit and thus also the fourth and fifth shift element can be omitted. For example, the first electric motor is then connected to the drive shaft via a first spur gear stage, while the second electric motor is connected to the driven shaft via a second spur gear stage. Reference is made here to the embodiment shown in FIG. 11. Alternatively, the first electric motor is connected to the drive shaft via a first spur gear stage and a second spur gear stage, while the second electric motor is connected to the driven shaft via a third spur gear stage and a fourth spur gear stage. Reference is made here to the embodiments shown in FIG. 7, FIG. 9, and FIG. 10.

According to one embodiment, the first shift unit is arranged radially nested at least partially on one circumference of the two planetary gear sets. The two planetary gear sets are therefore arranged at least partially within the first shift unit. This makes the drive unit axially more compact. Reference is made here to the embodiments shown in FIG. 1 through FIG. 7.

According to one embodiment, the first shift unit is arranged radially nested at least partially on one circumference of the differential. The differential is therefore arranged at least partially within the first shift unit. This makes the drive unit axially more compact. Reference is made here to the embodiments shown in FIG. 8 through FIG. 12.

According to one embodiment, the differential is arranged coaxially to the manual gearbox, with the third differential output shaft being guided axially through the driven shaft. Preferably, the differential input shaft is connected to the driven shaft in a rotationally fixed manner. This makes the drive unit particularly compact. Reference is made here to the embodiments shown in FIG. 2, FIG. 3, FIG. 5, FIG. 7 through FIG. 10, and FIG. 12.

According to a preferred embodiment, the differential is designed as a ball or bevel gear differential. A differential designed as a ball or bevel gear differential has two output elements on the wheel side, in particular a first output gear and a second output gear. The two output gears each mesh with a balancing element. The balancing elements are mounted in a differential cage so that they can rotate about their own axle. The respective output gear is connected to the respective differential output shaft in a rotationally fixed manner. The differential is driven via the differential cage, which is configured as a differential input shaft. Furthermore, alternative forms of differential training are also conceivable, for example as a spur gear differential or planetary differential. The drive power fed into the differential via the differential input shaft is distributed to the two differential output shafts in a known manner and transmitted to the drive wheels of the axle. The differential output shafts are configured to be connected to the drive gears of the vehicle with an actuating effect. The respective differential output shaft can be connected directly or immediately, or indirectly or immediately, via a downstream fixed transmission, a joint, a drive shaft, and/or a wheel hub to the associated vehicle wheel.

According to one embodiment, the differential is arranged transversely to the manual gearbox, with the differential input shaft being connected to the driven shaft via a bevel gear stage. Reference is made here to the embodiment shown in FIG. 6.

According to one embodiment, the differential is arranged axially parallel to the manual gearbox, with the differential input shaft being connected to the driven shaft via at least one spur gear stage. Reference is made here to the embodiments shown in FIG. 4 and FIG. 11.

According to one embodiment, the drive shaft is designed as a hollow shaft, with the driven shaft arranged inside the drive shaft. The driven shaft is therefore guided axially through the entire drive shaft, making the drive unit particularly compact. Reference is made here to the embodiments shown in FIGS. 2 through 9 and FIG. 11.

A vehicle according to the invention comprises one drive unit according to the invention. The above definitions and explanations of technical effects, advantages, and advantageous embodiments of the drive unit according to the invention also apply mutatis mutandis to the vehicle according to the invention.

BRIEF DESCRIPTION OF THE DRAWINGS

Advantageous embodiments of the invention, which are explained below, are shown in the drawings, wherein identical or similar elements are provided with the same reference numerals. The following are shown.

DETAILED DESCRIPTION

Figure 1:
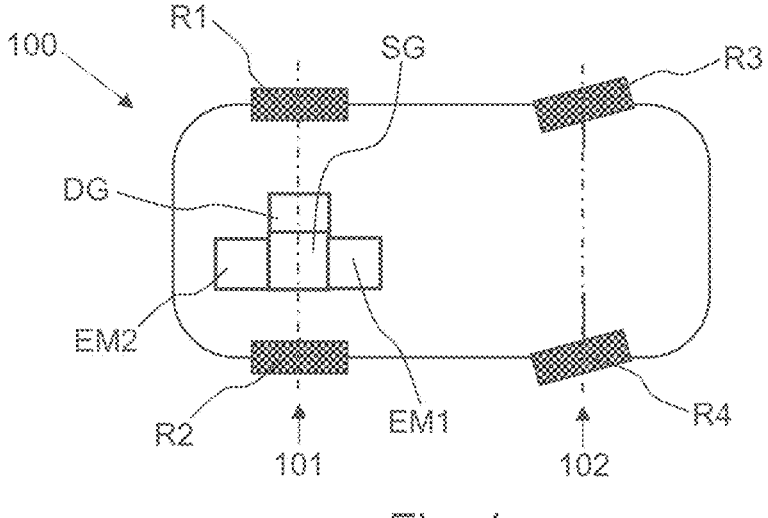
FIG. 1: a highly abstract schematic view of a vehicle with a drive axle, which has a drive unit according to the invention.
Figure 2:
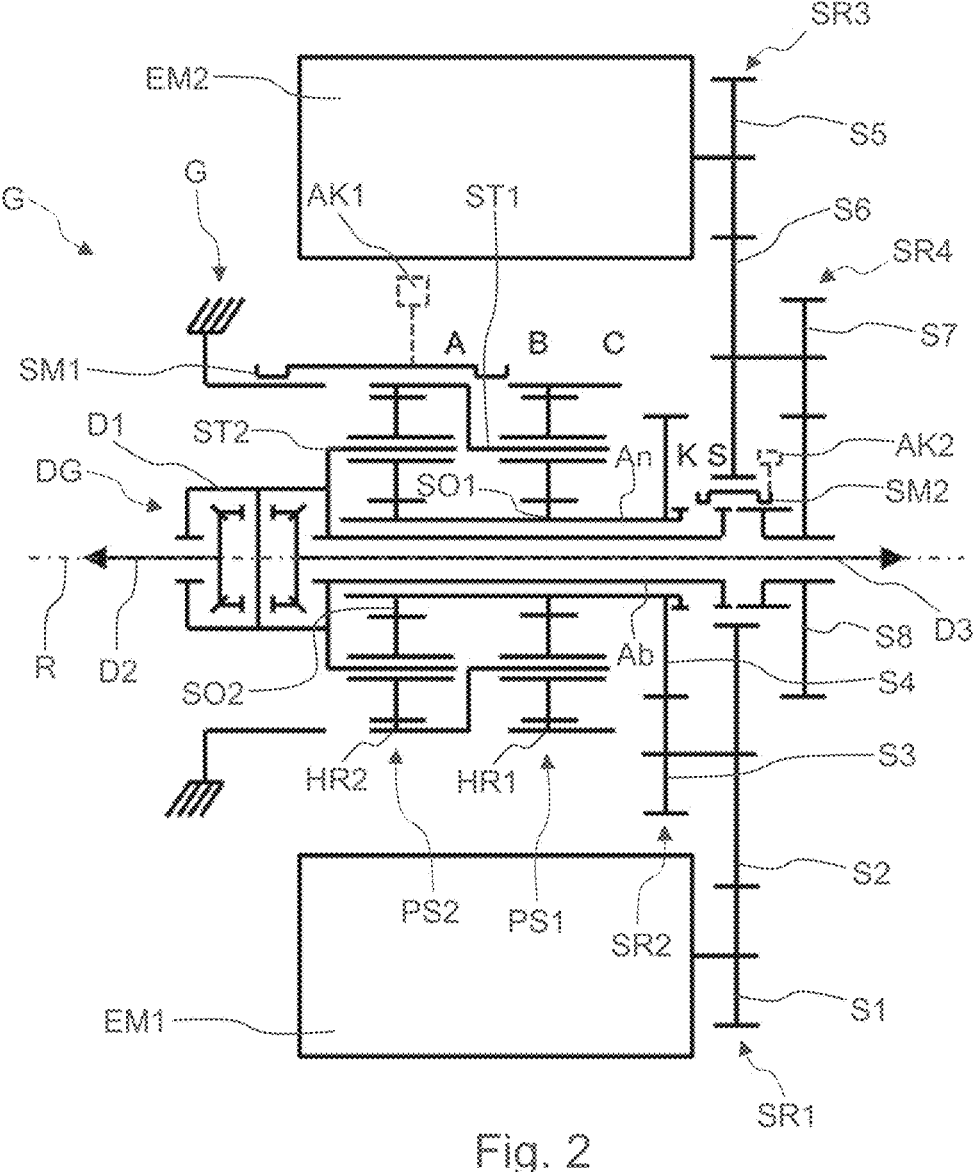
FIG. 2: a highly abstract schematic view of a drive unit according to the invention in accordance with a first embodiment.

FIG. 1 shows a vehicle 100 with a first axle 101 with two vehicle wheels R1, R2 and a second axle 102 with two vehicle wheels R3, R4. In the present case, the first axle 101 is designed as the rear drive axle of the vehicle 100 and is equipped with a drive unit according to the invention. The drive unit comprises a first and a second electric motor EM1, EM2, which are each set up to generate a drive power, a manual gearbox SG with two gears, and a differential DG. The vehicle 100 is therefore designed as an electric vehicle, i.e., a vehicle that can be driven electrically. The drive unit is arranged transversely to the longitudinal direction of the vehicle and is connected to the vehicle wheels R1, R2 of the first axle 101 with an actuating effect. A detailed embodiment of this drive unit is shown in FIG. 2. Alternatively, as shown in more detail in FIG. 6, the differential DG can be arranged transversely to the longitudinal direction of the vehicle.

In the present case, no further drive unit is arranged on the second axle 102, i.e., on the front axle of the vehicle 100, which saves costs, weight, and installation space. Alternatively, the drive unit can be arranged on the front axle of the vehicle 100 instead of the rear axle. To implement an all-wheel drive system, a further drive unit can be arranged on the second axle 102 and connected to the vehicle wheels R3, R4 of this axle 102 with a drive effect.

FIG. 2 shows the drive unit according to a first embodiment. The drive unit comprises a drive shaft An for connecting the first electric motor EM1 to the manual gearbox SG and a driven shaft Ab for connecting the manual gearbox SG to the differential DG. The manual gearbox SG has a first planetary gear set PS1, a second planetary gear set PS2, and a first positive-locking shift unit. The first shift unit has a first shift element A, a second shift element B, a third shift element C, and an axially displaceable first sliding sleeve SM1, the first sliding sleeve SM1 being axially displaceable into a respective one of five shift positions by means of a first actuator AK1. Furthermore, the drive unit also has a second positive-locking shift unit with a fourth shift element K, a fifth shift element S, and a second sliding sleeve SM2, which can be moved into one of three shift positions by means of a second actuator AK2. The drive shaft An is designed as a hollow shaft and the driven shaft Ab is arranged inside the drive shaft An, which makes the drive unit particularly compact. The differential DG has a differential input shaft D1 and two differential output shafts D2, D3, wherein the differential DG is arranged coaxially with the manual gearbox SG and the third differential output shaft D3 is guided axially through the driven shaft Ab, thereby making the drive unit even more compact. The differential input shaft D1 is connected to the driven shaft Ab in a rotationally fixed manner.

The differential DG is designed as a ball or bevel gear differential. The differential input shaft D1 is designed as a differential basket. The differential DG, which is designed as a ball or bevel gear differential, has two output elements on the wheel side, in particular a first output gear and a second output gear. The two output gears each mesh with a balancing element. The balancing elements are mounted in the differential cage so that they can rotate about their own axle. The respective output gear is connected in a rotationally fixed manner to the respective differential output shaft D2, D3. Consequently, the differential DG is driven via the differential cage, which is connected to the driven shaft Ab in a rotationally fixed manner. Arrows on the differential output shafts D2, D3 indicate a connection to a respective vehicle wheel on this vehicle axle.

The first electric motor EM1 is connected to the drive shaft An via a first spur gear stage SR1 and a second spur gear stage SR2. In the present case, the first spur gear stage SR1 has a first spur gear S1 and a second spur gear S2, which engage in a tooth mesh with each other. Furthermore, the second spur gear stage SR2 has a third spur gear S3 and a fourth spur gear S4, which engage in a tooth mesh with each other. In the present case, the first spur gear S1 is connected in a rotationally fixed manner to a rotor shaft of the first electric motor EM1, with the second and third spur gears S2, S3 being connected in a rotationally fixed manner, with the fourth spur gear S4 being connected in a rotationally fixed manner to the drive shaft An.

The second electric motor EM2 can be connected to the drive shaft An or to the driven shaft Ab via the third spur gear stage SR3 and the fourth spur gear stage SR4. Furthermore, the third spur gear stage SR3 has a fifth spur gear S5 and a sixth spur gear S6, which engage in a tooth mesh with each other. The fourth spur gear stage SR4 has a seventh spur gear S7 and an eighth spur gear S8, which engage in a tooth mesh with each other. The fifth spur gear S5 is connected in a rotationally fixed manner to a rotor shaft of the second electric motor EM2, wherein the sixth and seventh spur gears S6, S7 are connected in a rotationally fixed manner, wherein the eighth spur gear S8 can be connected in a rotationally fixed manner to the drive shaft An or to the driven shaft Ab via the second shift unit. When the fourth shift element K is closed, the eighth spur gear S8 is connected in a rotationally fixed manner to the drive shaft An. When the fifth shift element S is closed, the eighth spur gear S8 is connected in a rotationally fixed manner to the driven shaft Ab. The second shift unit is arranged radially nested with the first spur gear stage SR1 and the third spur gear stage SR3, i.e., in an axial installation space plane, in order to save axial installation space.

The drive shaft An, the driven shaft Ab, the manual gearbox SG, and the differential DG are arranged on a common axis of rotation R and are therefore coaxial to each other. The two electric motors EM1, EM2 are arranged with their axes parallel to the axis of rotation R. According to an axial sequence, the second planet set PS2 is arranged axially adjacent to the differential DG, wherein the first planet set PS1 is arranged axially adjacent to the second planet set PS2, wherein the second spur gear stage SR2 is arranged axially adjacent to the first planet set PS1, wherein the second shift unit is arranged axially adjacent to the second spur gear stage SR2, wherein the fourth spur gear stage SR4 is arranged axially adjacent to the first shift unit.

In a first shift position of the second sliding sleeve SM2, the fourth shift element K is closed and the second electric motor EM2 is connected to the drive shaft An in a drive-effective manner. In a second shift position of the second sliding sleeve SM2, both shift elements K, S are open, wherein the second electric motor EM2 is thereby decoupled from the manual gearbox SG. This second shift position of the second sliding sleeve SM2 is shown in FIG. 2. In a third shift position of the second sliding sleeve SM2, the fifth shift element S is closed and the second electric motor EM2 is connected to the driven shaft Ab with a driving effect.

The two planetary gear sets PS1 and PS2 are arranged axially adjacent to each other in order to save installation space and increase compactness. The first planetary gear set PS1 comprises three shafts, namely a first sun shaft SO1, a first hollow gear shaft HR1, and a first web shaft ST1. The first web shaft ST1 carries multiple planetary gears which mesh with the first sun shaft SO1 and with the first hollow gear shaft HR1, i.e., engage in a tooth mesh. The second planetary gear set PS2 also comprises three shafts, namely a second sun shaft SO2, a second hollow gear shaft HR2, and a second web shaft ST2. The second web shaft ST2 carries several planetary gears which mesh with the second sun shaft SO2 and the second hollow gear shaft HR2.

The first sun shaft SO1, the second sun shaft SO2, and the drive shaft An are connected in a rotationally fixed manner. The first web shaft ST1 and the second hollow gear shaft HR2 are connected in a rotationally fixed manner. The second web shaft ST2 and the driven shaft Ab are connected in a rotationally fixed manner. In a closed state of the first shift element A, the second hollow gear shaft HR2 and the first web shaft ST1 are connected in a rotationally fixed manner to a stationary component in the form of a housing G. In a closed state of the second shift element B, the first hollow gear shaft HR1 is connected in a rotationally fixed manner to a stationary component in the form of a housing G. In a closed state of the third shift element C, the two planetary gear sets PS1, PS2 are locked, with the second hollow gear shaft HR2 and the first web shaft ST1 being connected to the first hollow gear shaft HR1 in a rotationally fixed manner.

The first shift unit is arranged radially nested on the outer circumference of the two planetary gear sets PS1, PS2 in order to save axial installation space and thereby increase the axial compactness. The first shift unit comprises the first sliding sleeve SM1, the first shift element A, the second shift element B, and the third shift element C, wherein five shift positions, namely three gear positions and two neutral positions, can be realized with the first shift unit. The respective neutral position is located between two respective gear positions. The five shift positions are realized by axially moving the first sliding sleeve SM1. The first sliding sleeve SM1 has claw shift elements and can be moved axially into the respective shift position by means of the first actuator AK1. Consequently, all five shift positions of the first shift unit are arranged linearly. The three gears are shifted one after the other or sequentially by moving the first sliding sleeve SM1 in an axial direction via the neutral positions. This not only saves weight and components, but also costs, installation space, and assembly work.

In the closed state of the first shift element A, a first gear is shifted with a first transmission ratio, wherein in the first gear the first web shaft ST1 and the second hollow gear shaft HR2 are connected to the stationary component in a rotationally fixed manner. In the closed state of the second shift element B, a second gear with a second transmission ratio is shifted, wherein in the second gear the first hollow gear shaft HR1 is connected to the stationary component in a rotationally fixed manner. In the closed state of the third shift element C, a third gear with a third transmission ratio is shifted, wherein the first hollow gear shaft HR1, the first web shaft ST1, and the second hollow gear shaft HR2 are connected in a rotationally fixed manner in the third gear.

The first gear is engaged when the first sliding sleeve SM1 is in a first gear position, i.e., in a first shift position. In an actuated or closed state, i.e., in the first shift position of the first sliding sleeve SM1, the first shift element A connects the first web shaft ST1 and the second hollow gear shaft HR2 to the stationary component in order to shift the first gear.

The first gear is selected by moving the first sliding sleeve SM1 axially into a first neutral position, i.e., into a second shift position. In the second shift position of the first sliding sleeve SM1, the first sliding sleeve SM1 is only in rotary engagement with the stationary component. In this neutral position, the shift elements A, B, C are open so that no gear is shifted and a target gear can be synchronized. This second shift position of the first sliding sleeve SM1 is shown in FIG. 2.

The second gear is engaged by moving the first sliding sleeve SM1 axially into a second gear position, i.e., into a third shift position. In an actuated or closed state, i.e., in the third shift position of the first sliding sleeve SM1, the second shift element B connects the first hollow gear shaft HR1 to the stationary component in order to shift the second gear.

The second gear is selected by moving the first sliding sleeve SM1 axially into a second neutral position, i.e., into a fourth shift position. In the fourth shift position of the first sliding sleeve SM1, the first sliding sleeve SM1 is only in rotary engagement with the first hollow gear shaft HR1. In this neutral position, the shift elements A, B, C are open so that no gear is shifted and a target gear can be synchronized.

The third gear is engaged by moving the first sliding sleeve SM1 axially into a third gear position, i.e., into a fifth shift position. In an actuated or closed state, i.e., in the fifth shift position of the first sliding sleeve SM1, the third shift element C connects the first hollow gear shaft HR1, the second hollow gear shaft HR2, and the first web shaft ST1 to the stationary component in order to shift to third gear. This blocks the two planetary gear sets PS1, PS2. Consequently, the two planetary gear sets PS1, PS2 circulate in the block.

The second electric motor EM2 can use the three gears of the manual gearbox SG by connecting it to the drive shaft An. The fourth shift element K is closed for this purpose. The second electric motor EM2 can drive directly onto the driven shaft Ab independently of the first electric motor EM1 when the fifth shift element S is closed.

In the closed state of the fourth shift element K, i.e., in the first shift position of the second sliding sleeve SM2, the second electric motor EM2 is connected to the drive shaft An with a driving effect, wherein torque summation of the two electric motors EM1, EM2 is made possible by the fact that both electric motors EM1, EM2 have the three gears of the manual gearbox SG.

In the open state of the fourth and fifth shift elements K, S, i.e., in the second shift position or neutral position of the second sliding sleeve SM2, the second electric motor EM2 is decoupled from the drive train, which means that electrical losses and losses due to rotating bearings can be reduced, for example in partial load operation.

In the closed state of the fifth shift element S, i.e., in the third shift position of the second sliding sleeve SM2, the second electric motor EM2 is connected to the driven shaft Ab in a drive-effective manner, wherein drive power can be introduced into the manual gearbox SG via a second path. In this way, the second electric motor EM2 can drive the vehicle independently of the first electric motor EM1 and support the tensile force during the shifting of the first electric motor EM1. This is a so-called "output-supported shifting" or "electromotive shifting" (EMS).

The transmission ratio for the second electric motor EM2 (direct gear) for shift support corresponds to the third gear (interlocking of the two planetary gear sets PS1, PS2). During the re-coupling of the second electric motor EM2, i.e., the changeover at the first and second shift element K, S, the first electric motor EM1 can support the tensile force. The manual gearbox SG is therefore powershiftable because one of the two electric motors EM1, EM2 can always support the tractive force. When the fifth shift element S is closed and the first, second, and third shift elements A, B, C are open, the second electric motor EM2 can drive in third gear and the first electric motor EM1 is decoupled from the drivetrain so that it cannot contribute any drive power to the drivetrain. However, the two planetary gear sets PS1 and PS2 then rotate load-free. Therefore, decoupling the second electric motor EM2 via the second shift unit is preferable for reasons of efficiency. In general, however, either the first electric motor EM1 or the second electric motor EM2 can be decoupled. This is preferably done in the partial load range.

The proposed decoupling strategy is to decouple the electric motor EM1 or EM2 whose temperature (or the temperature of the associated inverter) is higher or whose operating point is more inefficient. This also allows alternating operation of the EM1 and EM2 electric motors. If none of the five shift elements A, B, C, K, S is closed, as shown here, both electric motors EM1, EM2 are decoupled from the drive train. This enables, for example, a "sailing mode" for the vehicle.

In the power-shift method, the first electric motor EM1 is assumed to be the main drive machine, since the first electric motor EM1 is firmly connected to the drive shaft An. To support the shifting process, the second electric motor EM2 is decoupled from the driven shaft Ab, wherein the second shift element S is closed.

In an exemplary shift from second gear to third gear, the second shift element B is opened, and the third shift element C is closed. In the event that the second electric motor EM2 is connected to the drive shaft An and thus drives both electric motors EM1, EM2 together, the load on the second electric motor EM2 is first reduced, then the fourth shift element K is opened, after which the second electric motor EM2 synchronizes the fifth shift element S and closes this shift element S. The second electric motor EM2 is then connected to the driven shaft Ab. The load is transferred by the second electric motor EM2 by building up torque on the second electric motor EM2 and simultaneously reducing torque on the first electric motor EM1 so that the second shift element B is relieved. To open the second shift element B, the first electric motor EM1 actively synchronizes the third shift element C. As soon as the shift element C is synchronized, the third shift element C is closed. The torques of the two electric motors EM1, EM2 can now be distributed as desired, since a fixed gear is engaged for the first electric motor EM1. After the shift, the second electric motor EM2 can be reconnected to the drive shaft An, depending on the operating strategy. This is done by moving the second sliding sleeve SM2, i.e., by opening the fifth shift element S and closing the fourth shift element K. Shifting from first gear to second gear takes place in the same way.

Figure 3:
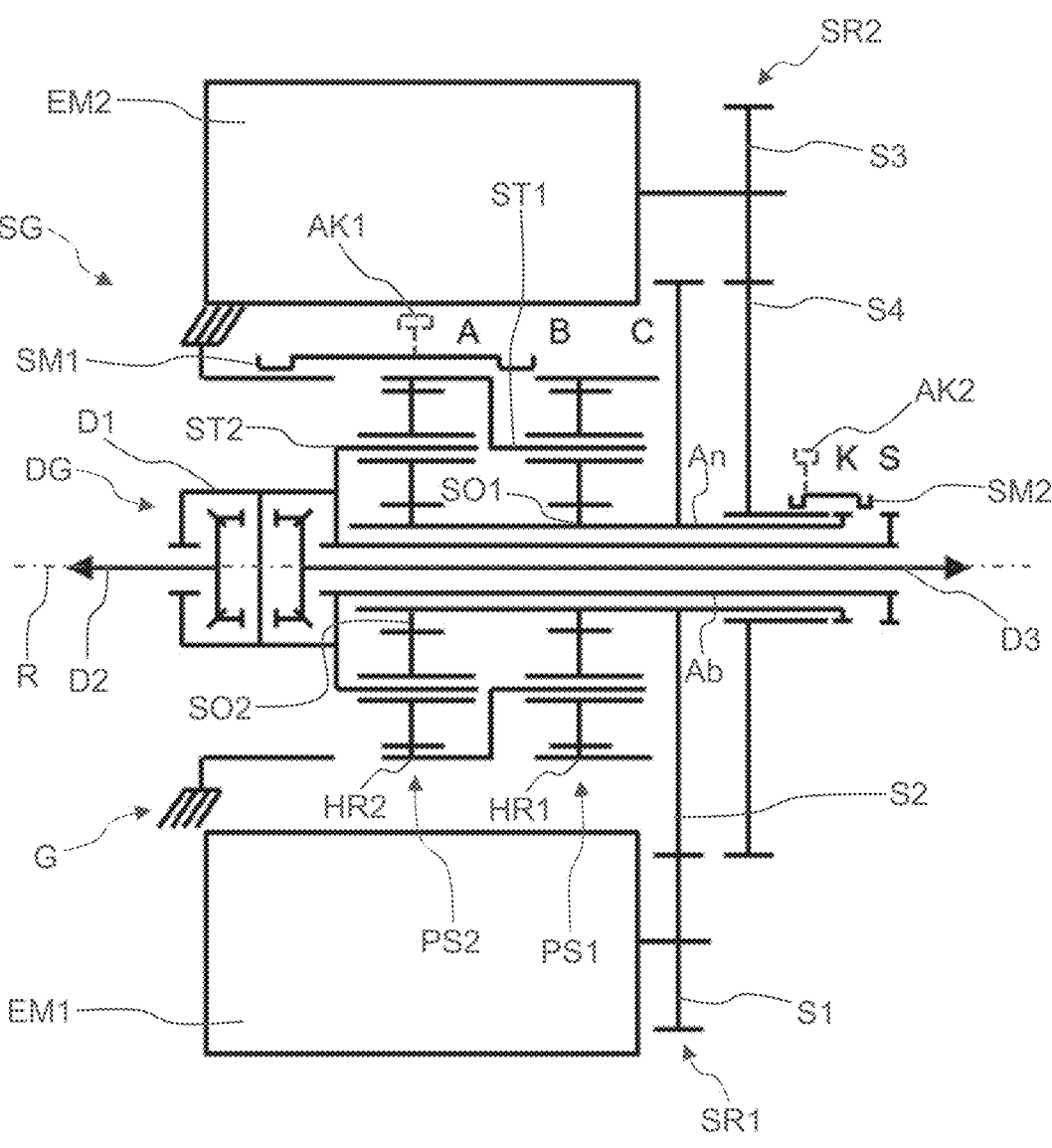
FIG. 3: a highly abstract schematic view of a drive unit according to the invention according to a second embodiment.

FIG. 3 shows a second embodiment of the drive unit according to the invention. The drive unit according to FIG. 3 essentially corresponds to the drive unit according to FIG. 2, with one difference between these two embodiments being the connection of the two electric motors EM1, EM2. In the present case, the first electric motor EM1 is connected to the drive shaft An via a first spur gear stage SR1, wherein the second electric motor EM2 can be connected to the drive shaft An or to the driven shaft Ab via a second spur gear stage SR2, depending on whether the fourth or fifth shift element K, S is closed. The first spur gear stage SR1 has a first spur gear S1 and a second spur gear S2, which engage in a tooth mesh with each other. The first spur gear S1 is connected in a rotationally fixed manner to a rotor shaft of the first electric motor EM1, wherein the second spur gear S2 is connected to the drive shaft An in a rotationally fixed manner. Furthermore, the second spur gear stage SR2 has a third spur gear S3 and a fourth spur gear S4, which engage in a tooth mesh with each other. The third spur gear S3 is connected in a rotationally fixed manner to a rotor shaft of the second electric motor EM2, wherein the fourth spur gear S4 can be connected in a rotationally fixed manner to the drive shaft An or to the driven shaft Ab via the second shift unit. When the fourth shift element K is closed, the fourth spur gear S4 is connected in a rotationally fixed manner to the drive shaft An. When the fifth shift element S is closed, the fourth spur gear S4 is connected in a rotationally fixed manner to the driven shaft Ab. Reducing the connection of the two electric motors EM1, EM2 to just one spur gear stage per connection improves the overall gearing efficiency of the drive unit from the perspective of the electric motors EM1, EM2. According to an axial sequence, the second planetary gear set PS2 is arranged axially adjacent to the differential DG, wherein the first planetary gear set PS1 is arranged axially adjacent to the second planetary gear set PS2, wherein the first spur gear stage SR1 is arranged axially adjacent to the first planetary gear set PS1, wherein the second spur gear stage SR2 is arranged axially adjacent to the first spur gear stage SR1, wherein the second shift unit is arranged axially adjacent to the second spur gear stage SR2. Otherwise, the exemplary embodiment according to FIG. 3 corresponds to the exemplary embodiment according to FIG. 2, to which reference is made.

Figure 4:
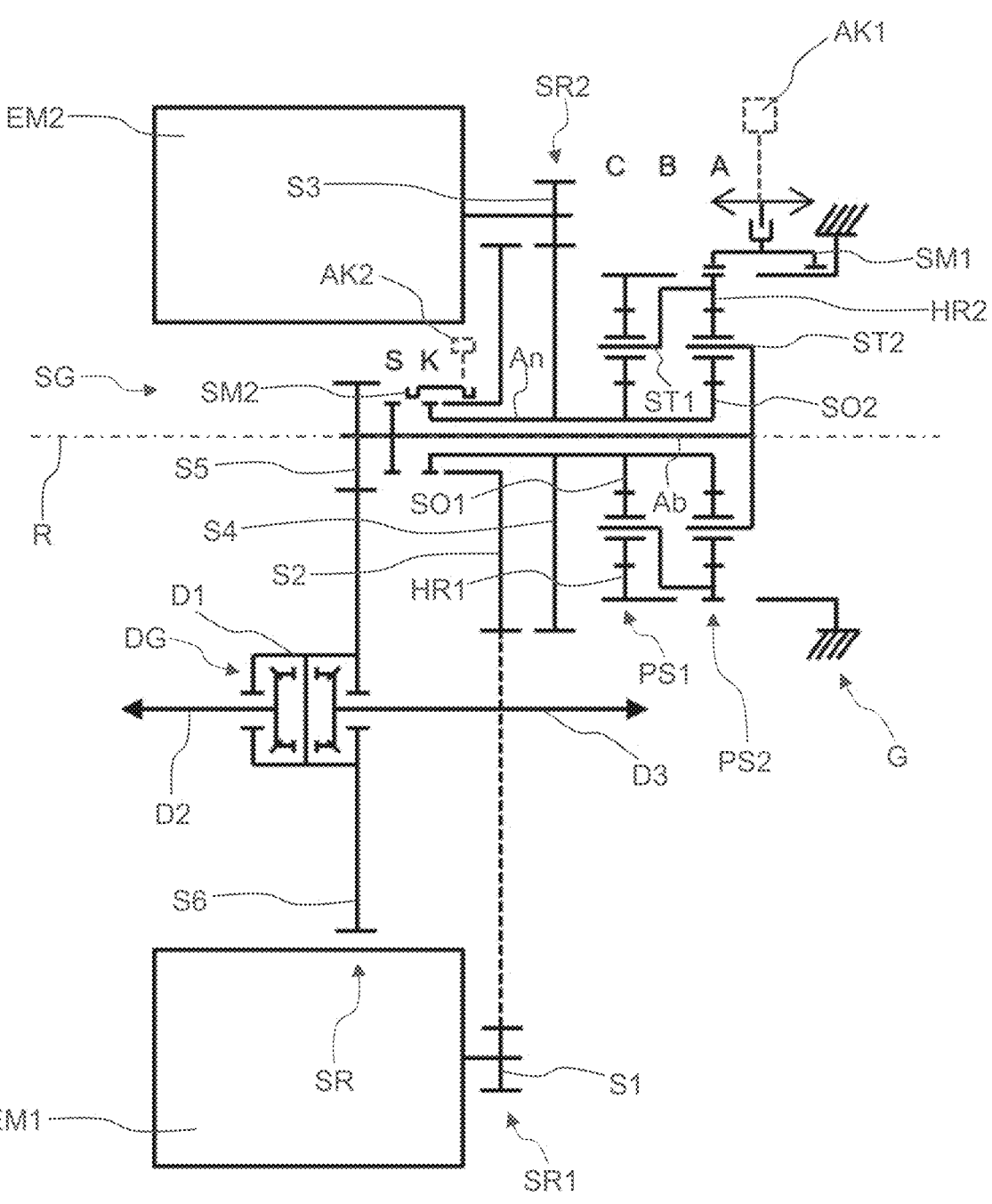
FIG. 4: a highly abstract schematic view of a drive unit according to the invention according to a third embodiment.

FIG. 4 shows a third embodiment of the drive unit according to the invention. The drive unit according to FIG. 4 essentially corresponds to the drive unit according to FIG. 2, with one difference between these two embodiments being the connection of the two electric motors EM1, EM2 and the connection of the differential DG. In the present case, the first electric motor EM1 is connected to the drive shaft An via a first spur gear stage SR1, wherein the second electric motor EM2 can be connected to the drive shaft An or to the driven shaft Ab via a second spur gear stage SR2, depending on whether the fourth or fifth shift element K, S is closed. The first spur gear stage SR1 has a first spur gear S1 and a second spur gear S2, which engage in a tooth mesh with each other. The first spur gear S1 is connected in a rotationally fixed manner to a rotor shaft of the first electric motor EM1, wherein the second spur gear S2 is connected to the drive shaft An in a rotationally fixed manner. Furthermore, the second spur gear stage SR2 has a third spur gear S3 and a fourth spur gear S4, which engage in a tooth mesh with each other. The third spur gear S3 is connected in a rotationally fixed manner to a rotor shaft of the second electric motor EM2, wherein the fourth spur gear S4 can be connected in a rotationally fixed manner to the drive shaft An or to the driven shaft Ab via the second shift unit. When the fourth shift element K is closed, the fourth spur gear S4 is connected in a rotationally fixed manner to the drive shaft An. When the fifth shift element S is closed, the fourth spur gear S4 is connected in a rotationally fixed manner to the driven shaft Ab. Reducing the connection of the two electric motors EM1, EM2 to just one spur gear stage per connection improves the overall gearing efficiency of the drive unit from the perspective of the electric motors EM1, EM2.

Furthermore, the differential DG is arranged axially parallel to the manual gearbox SG and is connected to the driven shaft Ab via a further spur gear stage SR, i.e., via a third spur gear stage. The spur gear stage SR has a fifth spur gear S5 and a sixth spur gear S6, which engage in a tooth mesh with each other. The fifth spur gear S5 is connected in a rotationally fixed manner to the driven shaft Ab, while the sixth spur gear S6 is connected in a rotationally fixed manner to the differential input shaft D1. One advantage of this embodiment over the embodiment shown in FIG. 2 is that the two planetary gear sets PS1, PS2 and the shift elements A, B, C in particular are subjected to a lower torque load, since part of the overall transmission ratio is achieved with the spur gear stage SR, which is arranged between the driven shaft Ab and the differential DG.

According to an axial sequence, the first spur gear stage SR1 is arranged axially adjacent to the spur gear stage SR, wherein the second spur gear stage SR2 is arranged axially adjacent to the first spur gear stage SR1, wherein the first planetary gear set PS1 is arranged axially adjacent to the second spur gear stage SR2, wherein the second planetary gear set PS2 is arranged axially adjacent to the first planetary gear set PS1. Otherwise, the exemplary embodiment according to FIG. 4 corresponds to the exemplary embodiment according to FIG. 2, to which reference is made.

Figure 5:
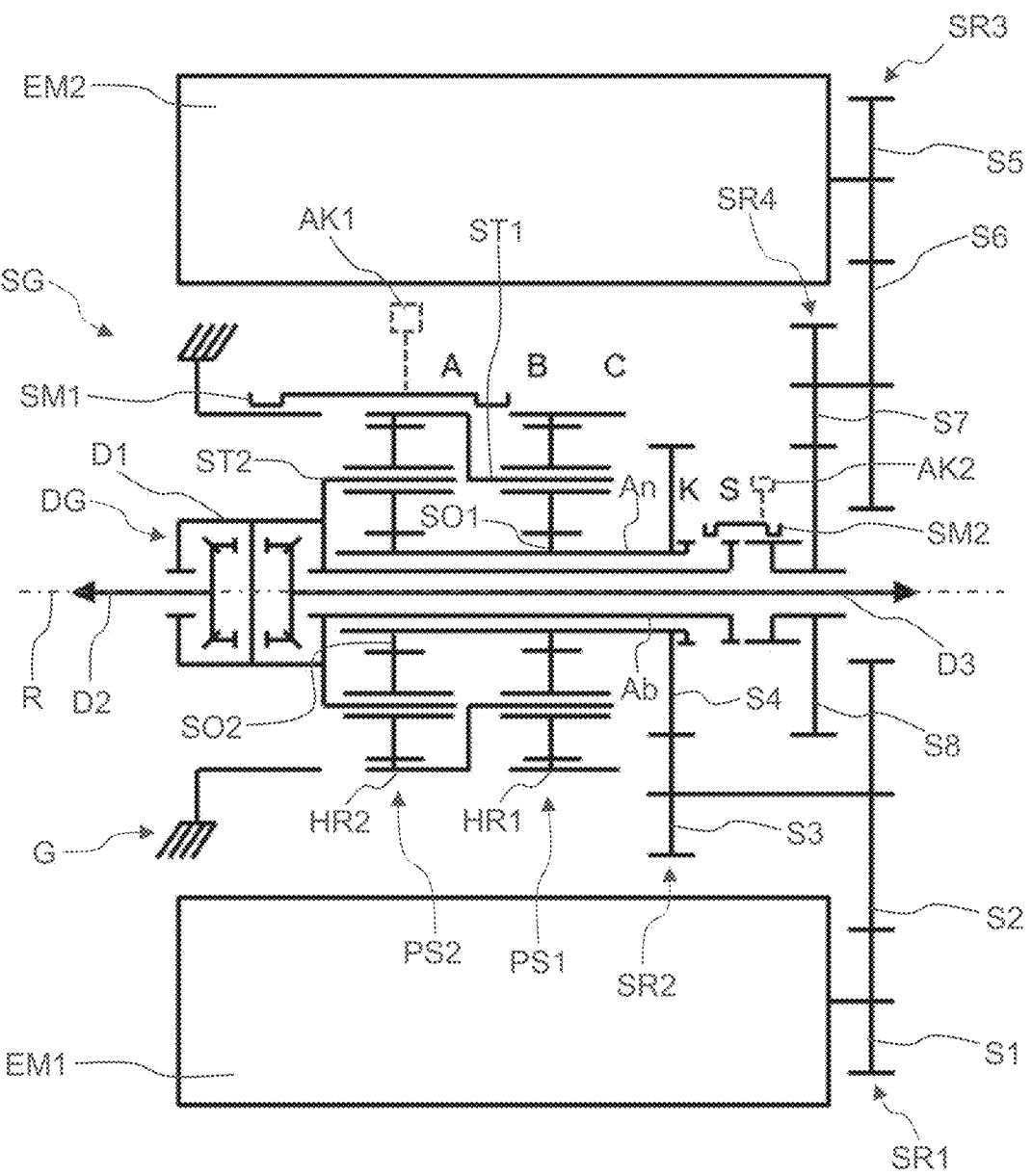
FIG. 5: a highly abstract schematic view of a drive unit according to the invention according to a fourth embodiment.

FIG. 5 shows a fourth embodiment of the drive unit according to the invention. The drive unit according to FIG. 5 essentially corresponds to the drive unit according to FIG. 2, wherein the difference between these two embodiments lies in the arrangement of the second shift unit and the spur gear stages. In the present case, the second shift unit is not stacked radially with the first and third spur gear stages SR1, SR3, but is arranged axially between the second and fourth spur gear stages SR2, SR4. Furthermore, the first and third spur gear stages SR1, SR3 are arranged in the same axial plane. This reduces the number of spur gear levels next to the two electric motors EM1, EM2, so that more axial installation space is available for the electric motors EM1, EM2. According to an axial sequence, the second planetary gear set PS2 is arranged axially adjacent to the differential DG, the first planetary gear set PS1 being arranged axially adjacent to the second planetary gear set PS2, the second spur gear stage SR2 being arranged axially adjacent to the first planetary gear set PS1, wherein the second shift unit is arranged axially adjacent to the second spur gear stage SR2, wherein the fourth spur gear stage SR4 is arranged axially adjacent to the first shift unit, wherein the first and third spur gear stages SR1, SR3 are arranged in a common axial plane adjacent to the fourth spur gear stage SR4. Otherwise, the exemplary embodiment according to FIG. 5 corresponds to the exemplary embodiment according to FIG. 2, to which reference is made.

Figure 6:
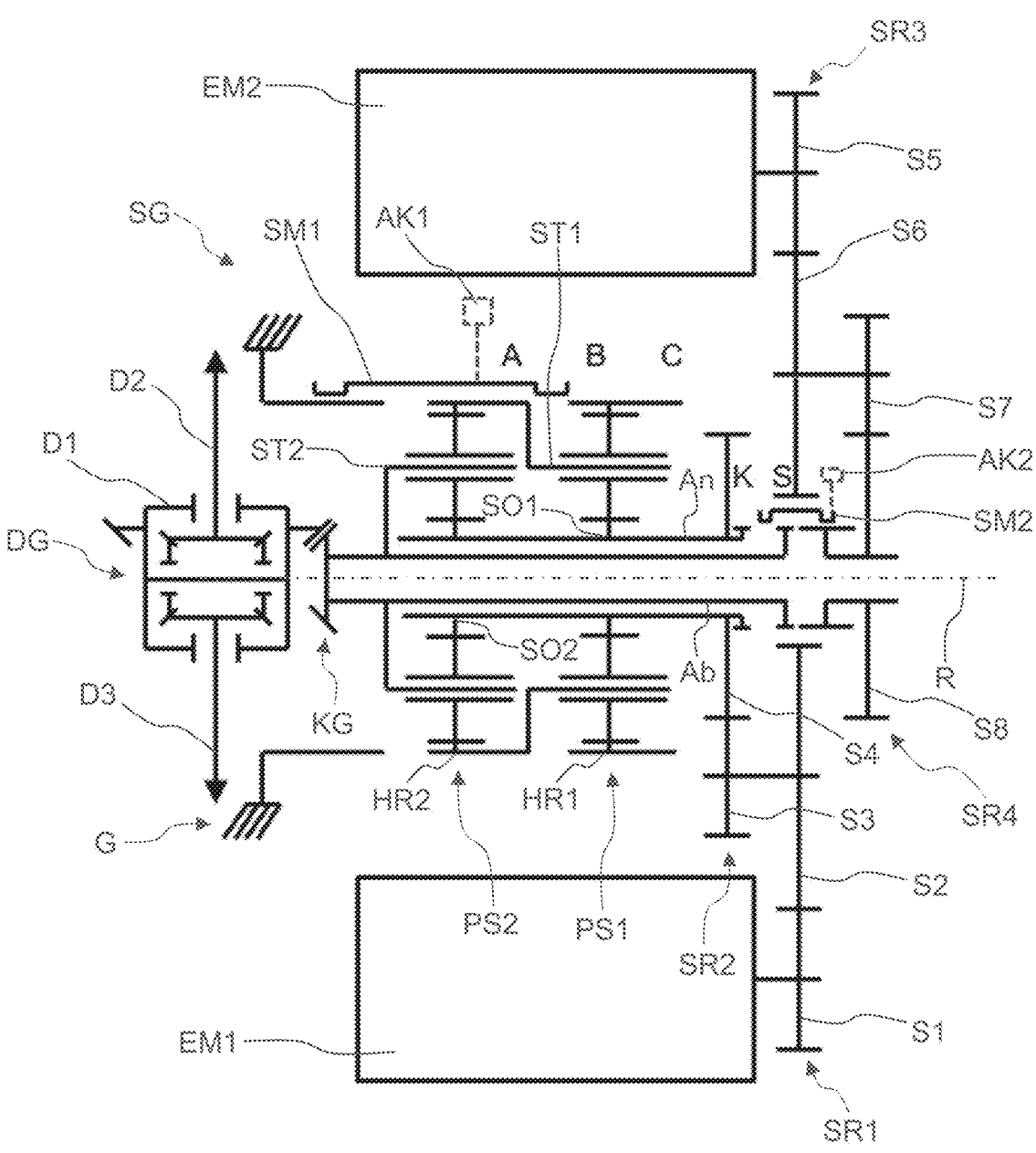
FIG. 6: a highly abstract schematic view of a drive unit according to the invention according to a fifth embodiment.

FIG. 6 shows a fifth embodiment of the drive unit according to the invention. The drive unit according to FIG. 6 essentially corresponds to the drive unit according to FIG. 2, wherein the difference between these two embodiments lies in the arrangement and connection of the differential DG. In the present case, the differential DG is connected to the driven shaft Ab via a bevel gear stage KG and is thus arranged transversely to the manual gearbox SG. As in the embodiment according to FIG. 2, the differential DG is also designed as a ball or bevel gear differential and has a differential input shaft D1 and two differential output shafts D2, D3. The differential input shaft D1 is designed as a differential basket and is connected in a rotationally fixed manner to a bevel gear of the bevel gear stage KG, wherein the other bevel gear of the bevel gear stage KG is connected in a rotationally fixed manner to the driven shaft Ab, and wherein the two bevel gears engage in a tooth mesh with each other. The manual gearbox SG is arranged in the longitudinal direction of the vehicle, while the differential DG is arranged in the transverse direction of the vehicle. The driven shaft Ab does not have to be designed as a hollow shaft and can in particular be designed as a solid shaft, as the second differential output shaft D3 is not guided through it. Otherwise, the exemplary embodiment according to FIG. 6 corresponds to the exemplary embodiment according to FIG. 2, to which reference is made.

Figure 7:
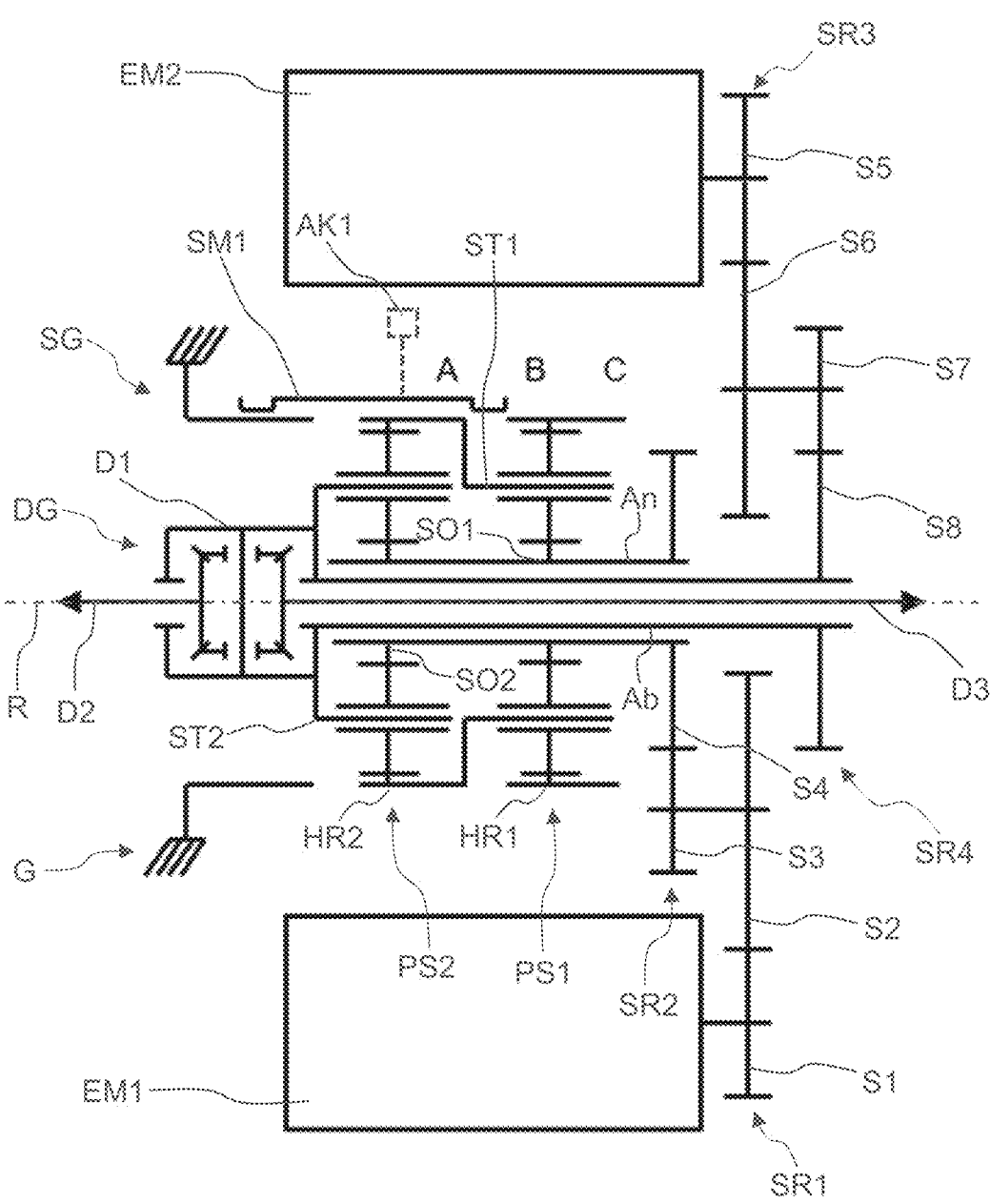
FIG. 7: a highly abstract schematic view of a drive unit according to the invention according to a sixth embodiment.

FIG. 7 shows a sixth embodiment of the drive unit according to the invention. The drive unit according to FIG. 7 essentially corresponds to the drive unit according to FIG. 2, wherein the difference between these two embodiments lies in the connection of the second electric motor EM2. In this case, the second electric motor EM2 is connected to the driven shaft Ab via a third spur gear stage SR3 and a fourth spur gear stage SR4. The second shift unit from the embodiment shown in FIG. 2 is therefore no longer required. In other words, the second electric motor EM2 with a constant transmission ratio is permanently and inseparably connected to the driven shaft Ab by the third and fourth spur gear stages SR3, SR4. The advantage of this is that only the first actuator AK1 is required, wherein the second actuator from the embodiment according to FIG. 2 can be omitted. The first and third spur gear stages ST1, ST3 are arranged in the same axial plane. Otherwise, the exemplary embodiment according to FIG. 7 corresponds to the exemplary embodiment according to FIG. 2, to which reference is made.

Figure 8:
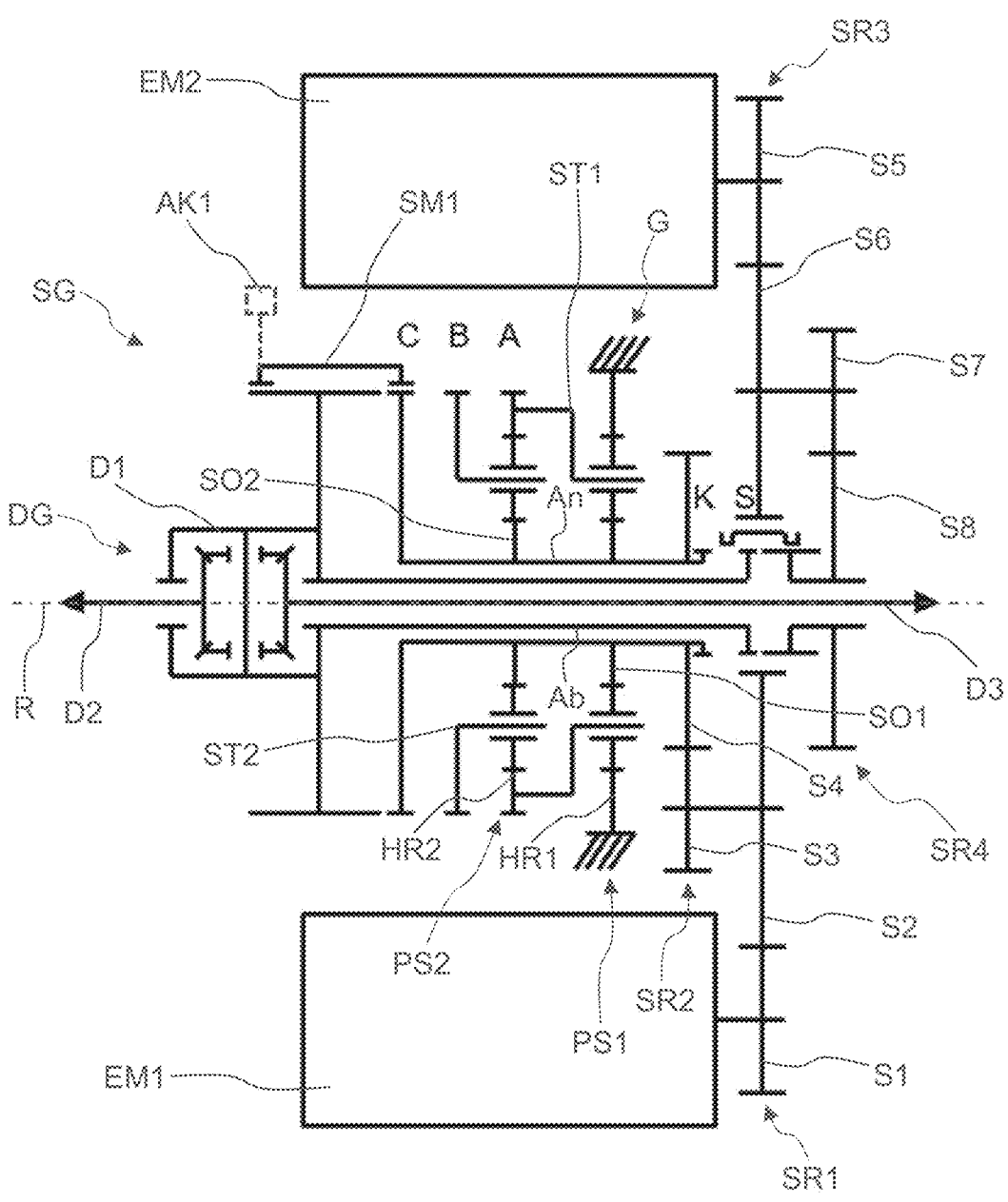
FIG. 8: a highly abstract schematic view of a drive unit according to the invention according to a seventh embodiment.

FIG. 8 shows a seventh embodiment of the drive unit according to the invention. The drive unit according to FIG. 8 essentially corresponds to the drive unit according to FIG. 2, wherein one difference between these two embodiments is the design of the manual gearbox SG. The manual gearbox SG is a so-called clutch variant. The first sun shaft SO1, the second sun shaft SO2, and the drive shaft An are connected in a rotationally fixed manner. The first web shaft ST1 and the second hollow gear shaft HR2 are connected in a rotationally fixed manner. The first hollow gear shaft HR1 is connected in a rotationally fixed manner to a stationary component in the form of a housing G. In the closed state of the first shift element A, a first gear with a first transmission ratio is shifted, wherein the first web shaft ST1, the second hollow gear shaft HR2, and the driven shaft Ab are connected in a rotationally fixed manner in the first gear. In the closed state of the second shift element B, a second gear with a second transmission ratio is shifted, wherein the second web shaft ST2 and the driven shaft Ab are connected in a rotationally fixed manner in the second gear. In the closed state of the third shift element C, a third gear with a third transmission ratio is engaged, wherein the first sun shaft SO1, the second sun shaft SO2, the drive shaft An, and the driven shaft Ab are connected in a rotationally fixed manner in the third gear. In all five shift positions of the first shift unit, the sliding sleeve SM1 is in rotary engagement with the driven shaft. It is advantageous that in the neutral positions of the first sliding sleeve SM1, both planetary gear sets PS1, PS2 and the first electric motor EM1 can be decoupled from the output. The second electric motor EM2 can then drive the vehicle alone via the fifth shift element S. Otherwise, the exemplary embodiment according to FIG. 8 corresponds to the exemplary embodiment according to FIG. 2, to which reference is made.

Figure 9:
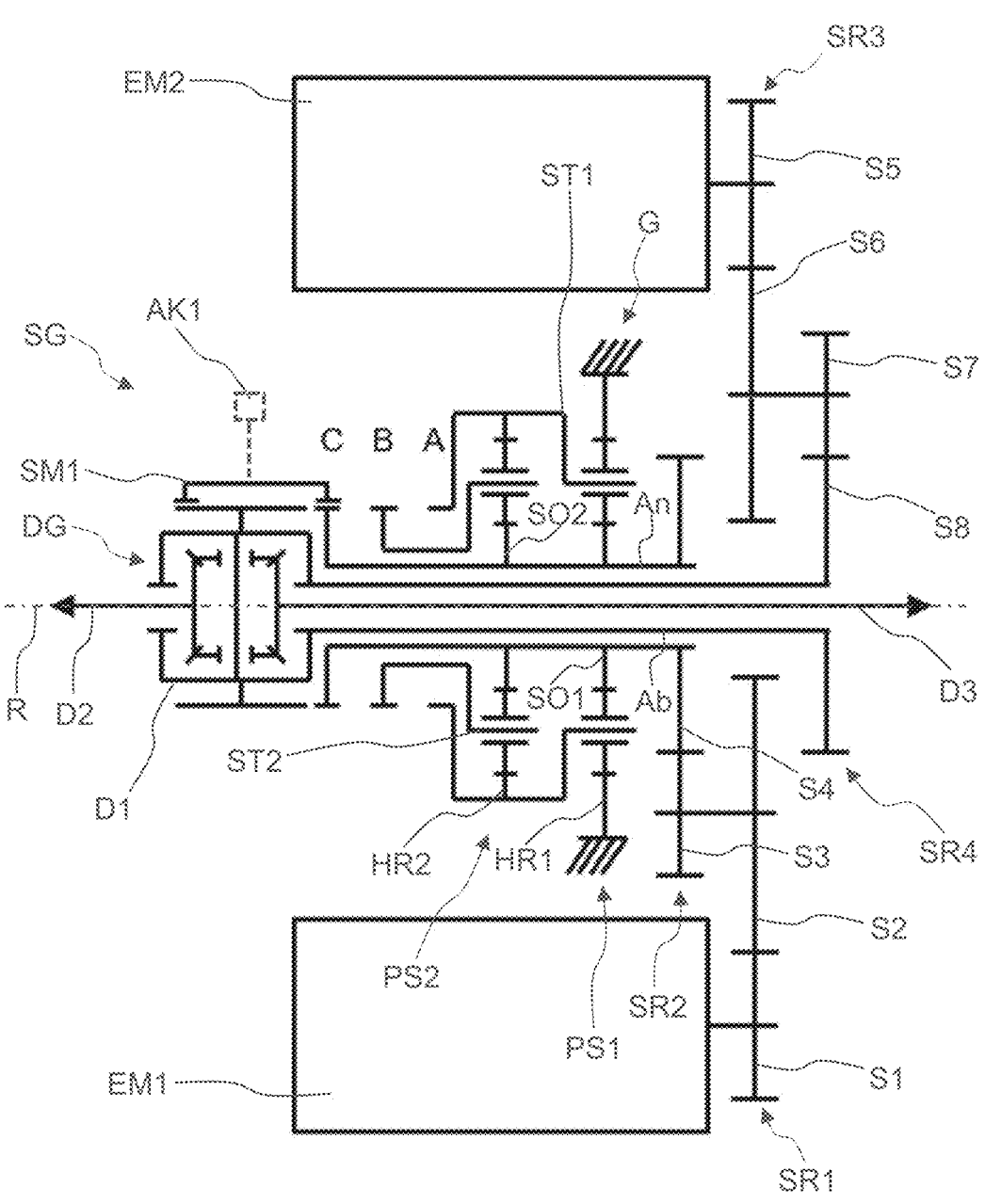
FIG. 9: a highly abstract schematic view of a drive unit according to the invention according to an eighth embodiment.

FIG. 9 shows an eighth embodiment of the drive unit according to the invention. The drive unit according to FIG. 9 essentially corresponds to the drive unit according to FIG. 8, with one difference between these two embodiments being the connection of the second electric motor EM2 and the design of the first shift unit. In this case, the second electric motor EM2 is connected to the driven shaft Ab via a third spur gear stage SR3 and a fourth spur gear stage SR4. The second shift unit from the embodiment shown in FIG. 8 is therefore no longer required. In other words, the second electric motor EM2 with a constant transmission ratio is permanently and inseparably connected to the driven shaft Ab by the third and fourth spur gear stages SR3, SR4. The advantage of this is that only the first actuator AK1 is required, wherein the second actuator from the embodiment according to FIG. 8 can be omitted. The first and third spur gear stages ST1, ST3 are arranged in the same axial plane. Furthermore, the first shift unit has a smaller diameter and is not arranged on the circumference of the planetary gear sets PS1, PS2, but axially adjacent to the second planetary gear set PS2 and at least partially stacked radially with the differential DG. This makes the drive unit more compact. Otherwise, the exemplary embodiment according to FIG. 9 corresponds to the exemplary embodiment according to FIG. 8, to which reference is made.

Figure 10:
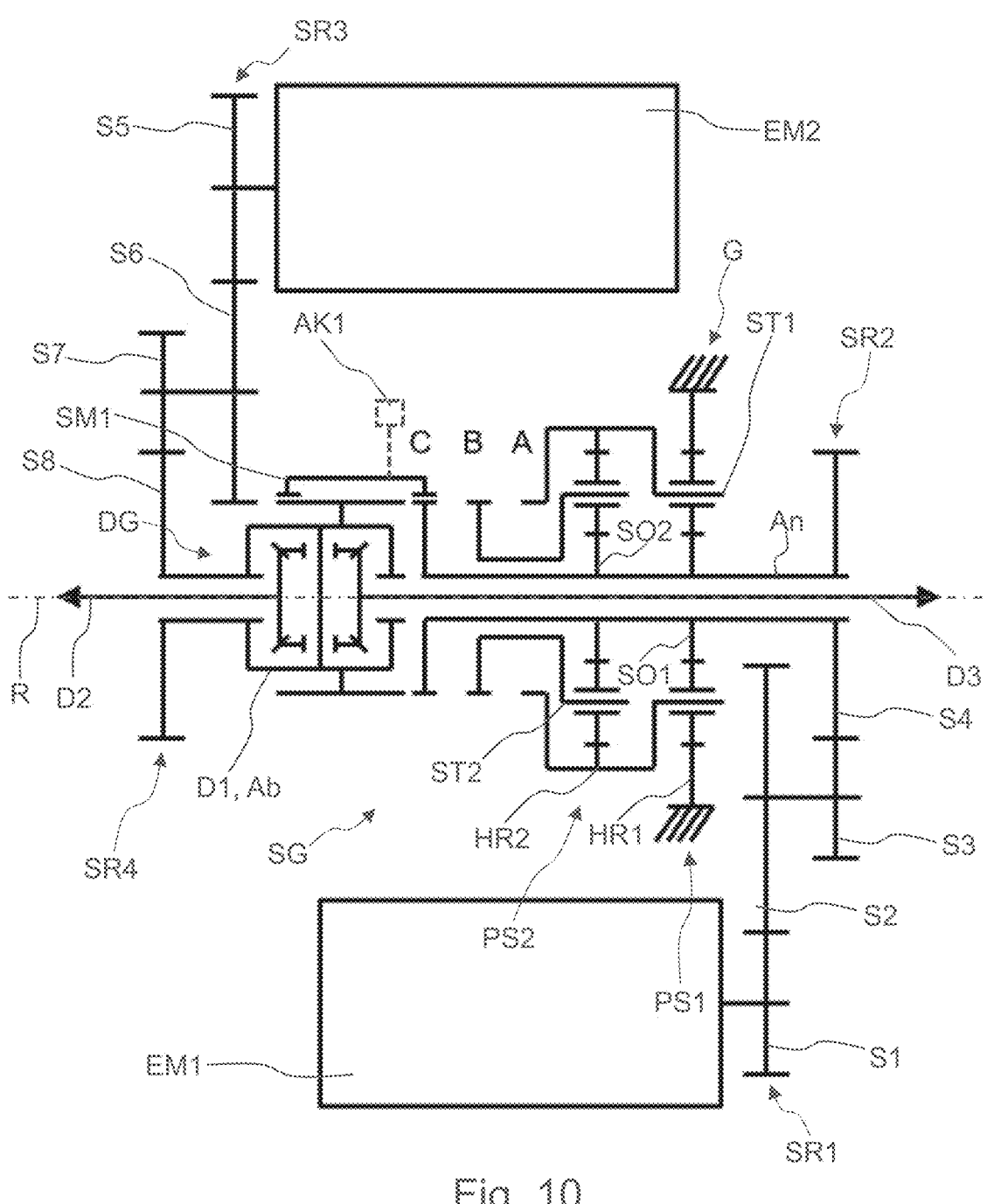
FIG. 10: a highly abstract schematic view of a drive unit according to the invention according to a ninth embodiment.

FIG. 10 shows a ninth embodiment of the drive unit according to the invention. The drive unit according to FIG. 10 essentially corresponds to the drive unit according to FIG. 8, with one difference between these two embodiments being the connection of the second electric motor EM2. In this case, the second electric motor EM2 is connected to the driven shaft Ab on the opposite side of the differential DG via the third spur gear stage SR3 and the fourth spur gear stage SR4. The advantage of this is that the driven shaft Ab, which is designed as a hollow shaft, can be omitted within the drive shaft An, which is designed as a hollow shaft, thus eliminating the need for a hollow shaft plane. The two planetary gear sets PS1, PS2 can thus be designed with a smaller diameter, in particular with smaller sun gears, which makes the manual gearbox SG more compact. According to an axial sequence, the third spur gear stage SR3 is arranged axially on the fourth spur gear stage SR4, wherein the differential DG is arranged axially on the third spur gear stage SR3, wherein the first shift unit is arranged axially on the differential DG, wherein the second planetary gear set PS2 is arranged axially on the first shift unit, wherein the first planetary gear set PS1 is arranged axially on the second planetary gear set PS2, wherein the first spur gear stage SR1 is arranged axially on the first planetary gear set PS1, wherein the second spur gear stage SR2 is arranged axially on the first spur gear stage SR1. Because the order of the first and second spur gear stages SR1, SR2 has been reversed, the second spur gear stage SR2 does not have to be arranged on the circumference of the first electric motor EM1, so that a larger diameter can be provided for the first electric motor EM1. Otherwise, the exemplary embodiment according to FIG. 10 corresponds to the exemplary embodiment according to FIG. 8, to which reference is made.

Figure 11:
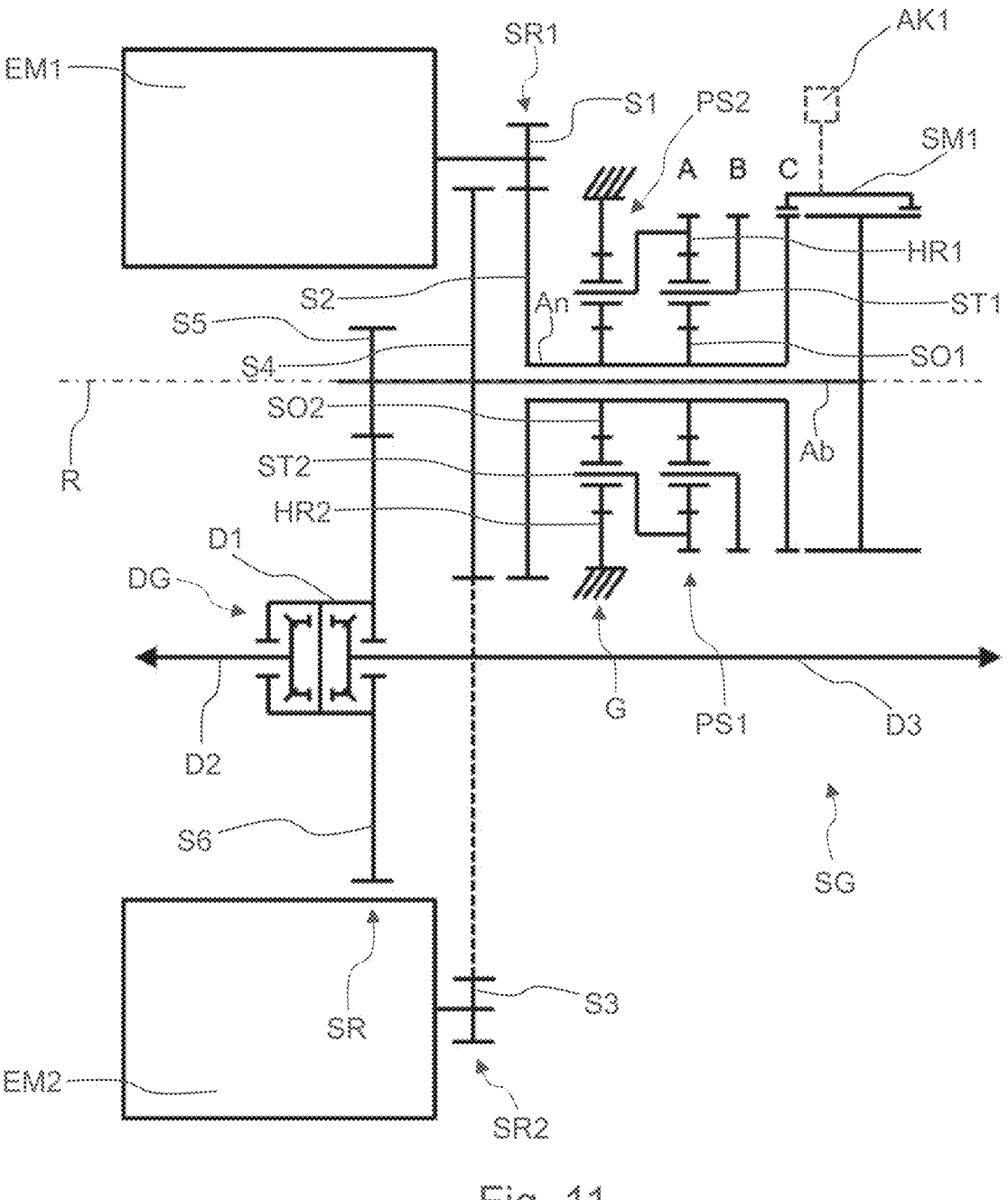
FIG. 11: a highly abstract schematic view of a drive unit according to the invention according to a tenth embodiment.

FIG. 11 shows a tenth embodiment of the drive unit according to the invention. The drive unit according to FIG. 11 essentially corresponds to the drive unit according to FIG. 9, wherein one difference between these two embodiments is the connection of the two electric motors EM1, EM2 and the differential DG. In the present case, the first electric motor EM1 is connected to the drive shaft An via a first spur gear stage SR1, while the second electric motor EM2 is connected to the driven shaft Ab via a second spur gear stage SR2. The first spur gear stage SR1 has a first spur gear S1 and a second spur gear S2, which engage in a tooth mesh with each other. The first spur gear S1 is connected in a rotationally fixed manner to a rotor shaft of the first electric motor EM1, wherein the second spur gear S2 is connected to the drive shaft An in a rotationally fixed manner. Furthermore, the second spur gear stage SR2 has a third spur gear S3 and a fourth spur gear S4, which engage in a tooth mesh with each other. The third spur gear S3 is connected in a rotationally fixed manner to a rotor shaft of the second electric motor EM2, while the fourth spur gear S4 is connected in a rotationally fixed manner to the driven shaft Ab.

Furthermore, the differential DG is arranged axially parallel to the manual gearbox SG and is connected to the driven shaft Ab via a further spur gear stage SR, i.e., via a third spur gear stage. The spur gear stage SR has a fifth spur gear S5 and a sixth spur gear S6, which engage in a tooth mesh with each other. The fifth spur gear S5 is connected in a rotationally fixed manner to the driven shaft Ab, while the sixth spur gear S6 is connected in a rotationally fixed manner to the differential input shaft D1. An advantage of this embodiment over the embodiment shown in FIG. 9 is that the two planetary gear sets PS1, PS2 and the shift elements A, B, C in particular are subjected to a lower torque load, since part of the overall transmission ratio is effected by the spur gear stage SR, which is arranged between the driven shaft Ab and the differential DG.

According to an axial sequence, the first spur gear stage SR1 is arranged axially adjacent to the spur gear stage SR, wherein the second spur gear stage SR2 is arranged axially adjacent to the first spur gear stage SR1, wherein the first planetary gear set PS1 is arranged axially adjacent to the first spur gear stage SR1, wherein the second planetary gear set PS2 is arranged axially adjacent to the first planetary gear set PS1. The first shift unit is arranged radially nested with the first planetary gear set PS1. Otherwise, the exemplary embodiment according to FIG. 11 corresponds to the exemplary embodiment according to FIG. 9, to which reference is made.

Figure 12:
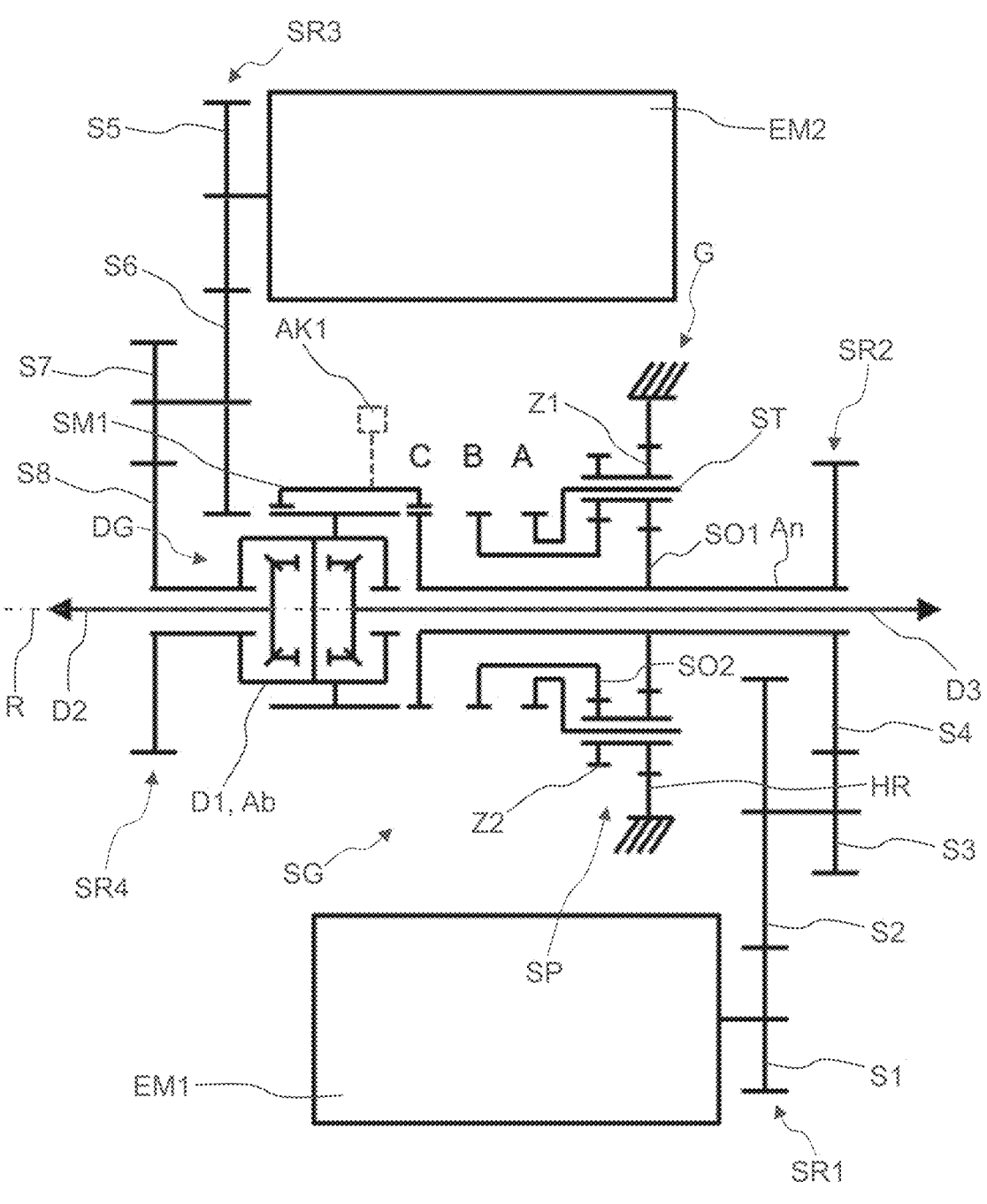
FIG. 12: a highly abstract schematic view of a drive unit according to the invention according to a tenth embodiment.

FIG. 12 shows an eleventh embodiment of the drive unit according to the invention. The drive unit according to FIG. 12 essentially corresponds to the drive unit according to FIG. 10, wherein the difference between these two embodiments lies in the design of the manual gearbox SG. In the present case, the manual gearbox SG has a stepped planetary gear set SP with a first sun shaft SO1, a second sun shaft SO2, a hollow gear shaft HR, and a web shaft ST with several stepped planetary gears, each having a first and second gear wheel Z1, Z2 connected in a rotationally fixed manner. The first gear wheel Z1 engages in a tooth mesh with the first sun shaft SO1 and the hollow gear shaft HR, while the second gear wheel Z2 engages in a tooth mesh with the second sun shaft SO2. The first sun shaft SO1 and the drive shaft An are connected in a rotationally fixed manner. The hollow gear shaft HR is connected in a rotationally fixed manner to a stationary component in the form of a housing G. In the closed state of the first shift element A, a first gear with a first transmission ratio is shifted, wherein the web shaft ST and the driven shaft Ab are connected in a rotationally fixed manner in the first gear. In the closed state of the second shift element B, a second gear with a second transmission ratio is shifted, wherein the second sun shaft SO2 and the driven shaft Ab are connected in a rotationally fixed manner in the second gear. In the closed state of the third shift element C, a third gear with a third transmission ratio is engaged, wherein the first sun shaft SO1, the drive shaft An, and the driven shaft Ab are connected in a rotationally fixed manner in the third gear. The first shift unit is arranged axially between the differential DG and the stepped planetary gear set SP. In particular, the first shift unit is at least partially radially nested with the differential DG, which increases its compactness. Otherwise, the exemplary embodiment according to FIG. 12 corresponds to the exemplary embodiment according to FIG. 10, to which reference is made.

REFERENCE NUMBERS

100 Vehicle
101 First axis
102 Second axis
R1 Vehicle wheel
R2 Vehicle wheel
R3 Vehicle wheel

18

R4 Vehicle wheel
An Drive shaft
Ab Driven shaft
SG Manual gearbox
EM1 First electric motor
EM2 Second electric motor
SR Spur gear stage
ST1 First spur gear stage
ST2 Second spur gear stage
ST3 Third spur gear stage
ST4 Fourth spur gear stage
S1 First spur gear
S2 Second spur gear
S3 Third spur gear
S4 Fourth spur gear
S5 Fifth spur gear
S6 Sixth spur gear
S7 Seventh spur gear
S8 Eighth spur gear
SP Level planet set
Z1 First gear wheel
Z2 Second gear wheel
HO3 Hollow gear shaft
ST3 Web shaft
PS1 First planetary gear set
SO1 First sun shaft
HO1 First hollow gear shaft
ST1 First web shaft
PS2 Second planetary gear set
SO2 Second sun shaft
HO2 Second hollow gear shaft
ST2 Second web shaft
PS3 Planet set
SO3 Sun shaft
HO3 Hollow gear shaft
ST3 Web shaft
AK1 First actuator
AK2 Second actuator
SM1 First sliding sleeve
SM2 Second sliding sleeve
G Housing
R Axis of rotation
KG Bevel gear stage
DG Differential
D1 Differential input shaft
D2 First differential output shaft
D3 Second differential output shaft
A First shift element
B Second shift element
C Third shift element
D Fourth shift element
S Fifth shift element

The invention claimed is:

1. A drive unit for a vehicle, comprising
a first electric motor;
a second electric motor arranged axially parallel to the first electric motor;
a manual gearbox arranged axially parallel to the first and second electric motors and having a first planetary gear set, a second planetary gear set, and a first positive-locking shift unit;
a differential with one differential input shaft and two differential output shafts;
a drive shaft configured for connecting the first electric motor to the manual gearbox; and
a driven shaft configured for connecting the manual gearbox to the differential;

wherein the first planetary gear set has a first sun shaft, a first hollow gear shaft, and a first web shaft, wherein the second planetary gear set has a second sun shaft, a second hollow gear shaft, and a second web shaft;

wherein the first sun shaft, the second sun shaft, and the drive shaft are connected in a rotationally fixed manner;

wherein the first web shaft and the second hollow gear shaft are connected in a rotationally fixed manner;

wherein the second web shaft and the driven shaft are connected in a rotationally fixed manner, wherein the first shift unit has a first shift element, a second shift element, a third shift element, and an axially displaceable first sliding sleeve;

wherein a first gear with a first transmission ratio is shifted in the closed state of the first shift element, wherein the first web shaft and the second hollow gear shaft are connected in a rotationally fixed manner to a stationary component in the first gear;

wherein in the closed state of the second shift element a second gear with a second transmission ratio is shifted, wherein in the second gear the first hollow gear shaft is connected to the stationary component in a rotationally fixed manner, and wherein a third gear with a third transmission ratio is shifted in the closed state of the third shift element, wherein the first and second planetary gear sets are locked in the third gear.

2. The drive unit according to claim 1, wherein the first electric motor is connected to the drive shaft via a first spur gear stage, wherein the second electric motor can be connected to the drive shaft or to the driven shaft via a second spur gear stage and a second shift unit with a fourth shift element, a fifth shift element, and a second sliding sleeve.

3. The drive unit according to claim 1, wherein:
the first electric motor is connected to the drive shaft via a first spur gear stage and a second spur gear stage; and
the second electric motor is configured to be connected to the drive shaft or to the driven shaft via a third spur gear stage, a fourth spur gear stage, and a second shift unit having a fourth shift element, a fifth shift element, and a second sliding sleeve.

4. The drive unit according to claim 1, wherein the first electric motor is connected to the drive shaft via a first spur gear stage, and wherein the second electric motor is connected to the driven shaft via a second spur gear stage.

5. The drive unit according to claim 1, wherein the first electric motor is connected to the drive shaft via a first spur gear stage and a second spur gear stage, and wherein the second electric motor is connected to the driven shaft via a third spur gear stage and a fourth spur gear stage.

6. The drive unit according to claim 1, wherein the first shift unit is arranged radially nested at least partially on a circumference of the first and second planetary gear sets.

7. The drive unit according to claim 1, wherein the first shift unit is arranged radially nested at least partially on a circumference of the differential.

8. The drive unit according to claim 1 wherein the differential is arranged coaxially to the manual gearbox and the third differential output shaft is guided axially through the driven shaft, and wherein the differential input shaft is connected in a rotationally fixed manner to the driven shaft.

9. The drive unit according to claim 1, wherein the differential is arranged transversely to the manual gearbox and the differential input shaft is connected to the driven shaft via a bevel gear stage.

10. The drive unit according to claim 1, wherein the differential is arranged axially parallel to the manual gearbox and the differential input shaft is connected to the driven shaft via at least one spur gear stage.

11. The drive unit according to claim 1, wherein the drive shaft is designed as a hollow shaft and the driven shaft is arranged inside the drive shaft.

12. A vehicle comprising at least one drive unit according to claim 1.

* * * * *